Aug. 29, 1961   F. C. HAVEMEYER 2ND   2,997,805
FISH HOLDER

Filed June 24, 1960   2 Sheets-Sheet 1

INVENTOR.
FREDERICK C. HAVEMEYER 2nd
BY
ATTORNEY

Aug. 29, 1961  F. C. HAVEMEYER 2ND  2,997,805
FISH HOLDER
Filed June 24, 1960  2 Sheets-Sheet 2

INVENTOR.
FREDERICK C. HAVEMEYER 2nd
BY
ATTORNEY

2,997,805
FISH HOLDER
Frederick C. Havemeyer 2nd, Mahwah, N.J.
Filed June 24, 1960, Ser. No. 38,663
7 Claims. (Cl. 43—53.5)

This invention concerns a new and improved fish holder especially adapted for use by fishermen, and other persons, to permit obtaining a firm grip on a fish when removing a fish hook or when handling the fish for other purposes.

According to the invention there is provided a device which acts as a grip engaging on the body of a fish and further engaging within the gills of the fish. The fish holder is formed with flaps which protect the hand of the person holding the fish.

It is therefore a principal object to provide a fish holder adapted for secure engagement on the hand of a fisherman to grip a fish while protecting the hand of the fisherman from a hook in the mouth or body of the fish, from a knife being wielded by the fisherman, and the like.

A further object is to provide a fish holder with flexible flaps for protecting a fisherman's hand, a roughened or grooved flexible pad for gripping the fish and further flaps adapted to be inserted in the gills of the fish for holding immovable the head of a fish.

Still another object is to provide a fish holder readily adaptable to encircle and embrace fish bodies of various sizes in a secure non-slipping safe manner for the hand of the fisherman.

For further comprehension of the invention, and of the objects and advantages thereof, reference will be had to the following description and accompanying drawings, and to the appended claims in which the various novel features of the invention are more particularly set forth.

In the accompanying drawings forming a material part of this disclosure:

Figures 1, 2:
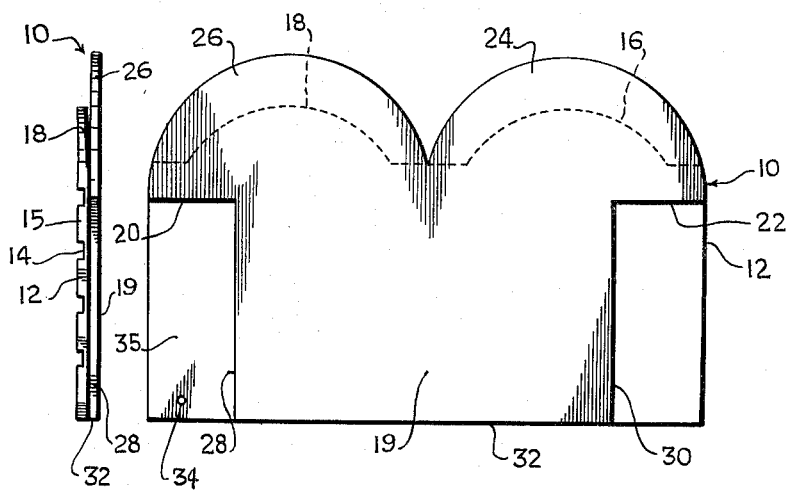
FIG. 1 is a rear elevational view of the fish holder in fully open position.
FIG. 2 is an elevational edgewise view of the fish holder.
Figure 3:
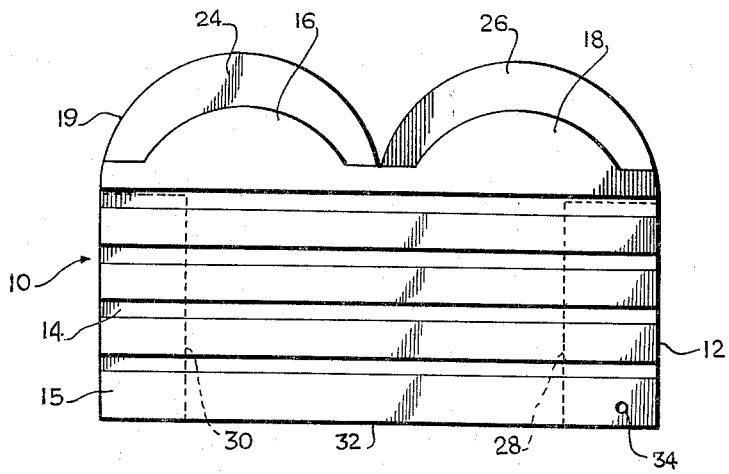
FIG. 3 is a front view of the fish holder.
Figure 4:
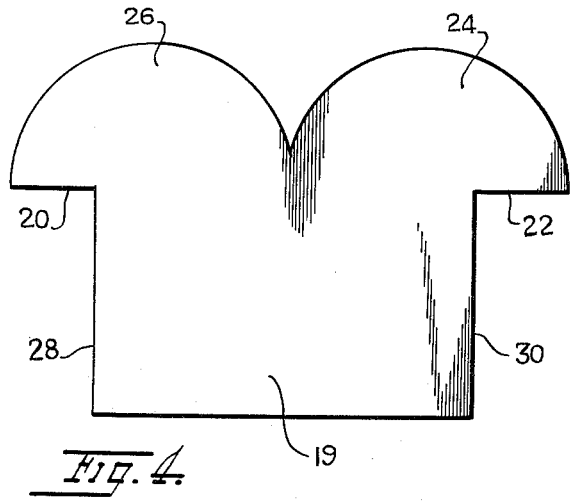
FIGS. 4 and 5 are rear views of component pads of the fish holder prior to assembly.
Figure 5:
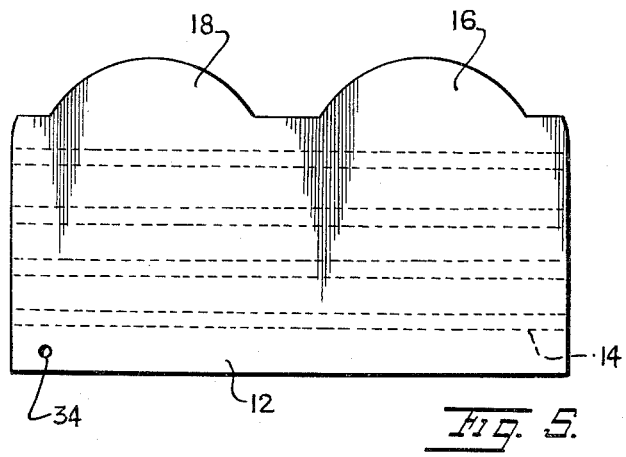
Figure 6:
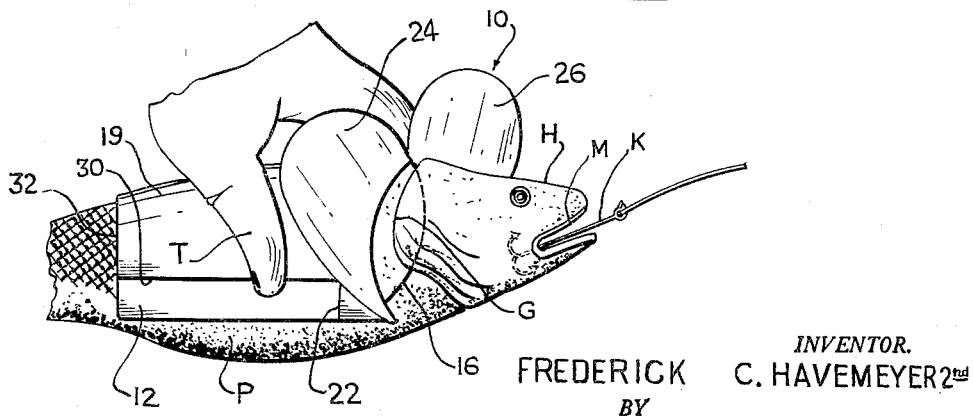
FIG. 6 is a side view of the fish holder in a closed operative position shown being used to grip a fish in the hand of a fisherman.

In FIGS. 1–6 is shown a fish holder 10 including a flexible substantially rectangular front pad 12 having a plurality of spaced parallel grooves 14 in side 15 extending from edge to edge thereof. At the top of the pad are two scalloped spaced projecting flaps 16, 18 adapted to enter under the gills G of a fish P when the fish holder is in use as shown in FIG. 6. Pad 12 is secured to an outer or rear pad 19, which is generally T-shaped with rectangular corner cutouts 20, 22 and two upper rounded scalloped flaps 24, 26. Pads 12 and 19 are secured together by a suitable adhesive (not shown) in overlaying relationship so that flaps 24, 26 extend beyond flaps 16, 18. Flaps 16, 18 are free from the flaps 24, 26 as shown in FIG. 2. The cutouts 20, 22 define steps or ledges 28, 30 which extend perpendicular to the bottom edge 32 of the fish holder. These steps can be gripped by the thumb and fingers of the user when a fish P is being held in the fish holder. A hole 34 in the exposed corner 35 of pad 12 permits the fish holder to be hung on a support such as a hook or nail when not in use.

The several pads may be made of rubber, leather or flexible plastic material.

FIG. 6 shows how a fish P can be gripped by the fish holder. The user will fold the fish holder 10 over the fish with the pad 12 juxtaposed to the body of the fish. The fingers and thumb T of the fisherman's hand will engage on ledges 28, 30. Flaps 24, 26 will be bent or draped over the back of the hand. The grooved side 15 will be pressed against opposite sides of the fish with the pad wrapped over the back or dorsal edge of the fish. The head H of the fish will be exposed and available for extracting a hook K shown protruding from the mouth M of the fish. The scalloped flaps 16, 18 may be inserted inside the grills G of the fish to provide a very secure hold on the fish. The insertion of the flaps 16 and 18 under the grills causes the mouth of the fish to open and stay open while the hook is being extracted. The parallel grooves and ridges of side 15 grip the body of the fish most effectively even though the body of the fish is smooth and slippery, and even though the fish may be alive and attempt to wriggle free.

The free flexible flaps 24, 26 protect the hand of the user from the sharp points of the hook as well as any knife or other sharp instrument he may use while holding the fish.

The fish holder can be picked up readily and wrapped around the fish to hold it as soon as the fish is pulled out of the water. After extraction of the hook the fish can be easily released by allowing it to slip lengthwise forwardly out of the holder, if the flaps 16, 18 are engaged under the gills.

The wide grooves 14 can readily be cleaned of scales or other debris which may accumulate therein.

The entire fish holder is waterproof, long lasting and economical to manufacture.

While I have illustrated and described the preferred embodiment of my invention, it is to be understood that I do not limit myself to the precise construction herein disclosed and that various changes and modifications may be made within the scope of the invention as defined in the appended claims.

Having thus described my invention, what I claim as new, and desire to secure by United States Letters Patent is:

1. A fish holder, comprising a first flexible, substantially rectangular pad, said pad having a scalloped end portion defining a first two flaps for entering inside the gills of a fish, and a second flexible pad secured to said rectangular pad, said second pad having a scalloped end portion defining two other flaps extending beyond the first-named two flaps for protecting the hand of a fisherman using the fish holder, the first two flaps being free from said two other flaps for flexing independently thereof.

2. A fish holder, comprising a first flexible, substantially rectangular pad, said pad having a scalloped end portion defining a first two flaps for entering inside the gills of a fish, and a second flexible pad secured to said rectangular pad, said second pad having a scalloped end portion defining two other flaps extending beyond the first-named two flaps for protecting the hand of a fisherman using the fish holder, the first two flaps being free from said two other flaps for flexing independently thereof, said first pad having an exposed side formed with a plurality of parallel grooves for effectively gripping the body of the fish.

3. A fish holder, comprising a first flexible, substantially rectangular pad, said pad having a scalloped end portion defining a first two flaps for entering inside the gills of a fish, and a second flexible pad secured to said rectangular pad, said second pad having a scalloped end portion defining two other flaps extending beyond the first-named two flaps for protecting the hand of a fisherman using the fish holder, the first two flaps being free from said two other flaps for flexing independently thereof, said second pad having corner cutouts defining ledges adapted to be gripped by the fingers and thumb of the user while holding the fish.

4. A fish holder, comprising a first flexible, substantially rectangular pad, said pad having a scalloped end portion defining a first two flaps for entering inside the gills of a fish, and a second flexible pad secured to said rectangular pad, said second pad having a scalloped end portion defining two other flaps extending beyond the first-named two flaps for protecting the hand of a fisherman using the fish holder, the first two flaps being free from said two other flaps for flexing independently thereof, said first pad having an exposed side formed with a plurality of parallel grooves for effectively gripping the body of the fish, said second pad having corner cutouts exposing rectangular corner portions of the first pad and defining ledges adapted to be gripped by the fingers and thumb of the user while holding the fish.

5. A fish holder, comprising a first flexible, substantially rectangular pad, said pad having a scalloped end portion defining a first two flaps for entering inside the gills of a fish, and a second flexible pad secured to said rectangular pad, said second pad having a scalloped end portion defining two other flaps extending beyond the first-named two flaps for protecting the hand of a fisherman using the fish holder, the first two flaps being free from said two other flaps for flexing independently thereof, said first pad having an exposed roughened side for effectively gripping the body of the fish.

6. A fish holder, comprising a first flexible, substantially rectangular pad, said pad having a scalloped end portion defining a first two flaps for entering inside the gills of a fish, and a second flexible pad secured to said rectangular pad, said second pad having a scalloped end portion defining two other flaps extending beyond the first-named two flaps for protecting the hand of a fisherman using the fish holder, the first two flaps being free from said two other flaps for flexing independently thereof, said first pad having an exposed roughened side for effectively gripping the body of the fish, said second pad having cutouts defining ledges adapted to be gripped by the fingers of the user while holding the fish.

7. A fish holder, comprising a first flexible, substantially rectangular pad, said pad having a scalloped end portion defining a first two flaps for entering inside the gills of a fish, and a second flexible pad secured to said rectangular pad, said second pad having a scalloped end portion defining two other flaps extending beyond the first-named two flaps for protecting the hand of a fisherman using the fish holder, the first two flaps being free from said two other flaps for flexing independently thereof, said first pad having an exposed roughened side for effectively gripping the body of the fish, said second pad having cutouts defining ledges adapted to be gripped by the fingers of the user while holding the fish, said pads being formed of thick rubber material.

References Cited in the file of this patent

UNITED STATES PATENTS

| | | |
|---|---|---|
| 590,347 | Sylvestre | Sept. 21, 1897 |
| 1,360,840 | White | Nov. 30, 1920 |
| 2,616,745 | Alston | Nov. 4, 1952 |
| 2,651,776 | Beatty | Sept. 15, 1953 |